United States Patent [19]

Drege

[11] Patent Number: 5,932,266
[45] Date of Patent: Aug. 3, 1999

[54] PROCEDURE FOR REDUCING THE LOSS OF WEIGHT OF VEGETABLES AFTER BLANCHING AND/OR COOKING

[76] Inventor: Gilles Drege, 20, rue d'Epluchard, 3, Résidence Dupetit Thouars, 49000 Angers, France

[21] Appl. No.: 08/836,060
[22] PCT Filed: Oct. 24, 1995
[86] PCT No.: PCT/FR95/01406
§ 371 Date: Jul. 25, 1997
§ 102(e) Date: Jul. 25, 1997
[87] PCT Pub. No.: WO96/12417
PCT Pub. Date: May 2, 1996

[30] Foreign Application Priority Data

Oct. 24, 1994 [FR] France ..................... 94 12664

[51] Int. Cl.$^6$ ........................................ A23L 3/00
[52] U.S. Cl. ............................. 426/521; 426/615
[58] Field of Search .................. 426/521, 615, 426/511, 506

[56] References Cited

U.S. PATENT DOCUMENTS

| | | | |
|---|---|---|---|
| 4,735,813 | 4/1988 | Spinoglio | 426/615 |
| 4,844,933 | 7/1989 | Hsieh et al. | 426/521 |

FOREIGN PATENT DOCUMENTS

| | | |
|---|---|---|
| 140 767 | 5/1985 | European Pat. Off. . |
| 197 805 | 10/1986 | European Pat. Off. . |
| 359 612 | 3/1990 | European Pat. Off. . |

*Primary Examiner*—George Yeung
*Attorney, Agent, or Firm*—Nixon & Vanderhye, P.C.

[57] ABSTRACT

A method for processing vegetables prior to a preservation step such as blanching, cooking or sterilization. The raw, washed and trimmed starting vegetables are pre-processed by exposing them at a temperature of 0–25° C. to a gas containing oxygen under a partial pressure greater than the partial pressure of oxygen in air at the temperature. The gas may be pressurized air. The pre-processing step reduces weight loss in vegetables after they have been blanched, cooked or sterilized.

12 Claims, No Drawings

PROCEDURE FOR REDUCING THE LOSS OF WEIGHT OF VEGETABLES AFTER BLANCHING AND/OR COOKING

The invention concerns a procedure for reducing the loss of weight of vegetables following a blanching and/or cooking and/or sterilization operation.

Such blanching/cooking/sterilization operations are employed on both a small and an industrial scale in order to preserve foods for later consumption. The preservation methods may vary widely, including deep-freezing, pasteurization, sterilization, pickling, etc.

The preservation of vegetables using one of the methods just mentioned is known to require various preliminary steps.

First, the vegetables should be cleaned and put in edible form, thereby requiring that they be peeled and possibly cut into pieces, and/or that unhealthy or poorly shaped parts be removed. For example, asparagus must be peeled and the cut at the base of the stalks trimmed a second time. As for mushrooms, the base is cut to the desired height.

Following these operations, vegetables in the so-called "trimmed" state are produced. They are ready to undergo the steps allowing preservation, for example blanching and/or cooking. It will be recalled that blanching consists in heat-treating trimmed vegetables for a short period, i.e., for a few minutes, in order mainly to destroy the enzymes which are present in the vegetable tissues and, in consequence, to block certain adverse chemical reactions. Blanching may be carried out, in particular, by immersion in boiling water or at a temperature approximating the boiling point, or, alternatively, by treating them with steam, for example at a temperature of about 100° C.

One major problem affecting the vegetable-preservation industry lies in the loss of weight which occurs following the blanching and/or cooking and/or sterilization procedures. This weight loss results from a loss of water and of various other substances which, in general, contribute to the nutritional value and/or the taste of the vegetables processed in this way. Furthermore, this weight loss has a pronounced effect on the cost price of preserved vegetables, which, in practice, are sold by weight of the drained vegetables. The term "preserved vegetable" as used herein designates any vegetable that has undergone processing for preservation purposes, e.g., deep-freezing, sterilization, pickling, etc.

To avoid these problems, various preliminary processing procedures involving impregnation with water that may contain dissolved nutritive substances have been proposed. Impregnation is normally carried out in a vacuum, in order to expel the air found in the pores of the vegetable tissues and, accordingly, to promote the infiltration of water. In this regard, see, for example, Certificate of Addition No. FR-2.214.414, European Patent No. 0.140.667, and the documents of prior art cited in the description of this European patent. Nevertheless, weight losses after blanching and/or cooking and/or sterilization remain significant.

To reduce weight loss, proposals have also been made to effect impregnation using various food additive thickeners or heat-coagulable additives (see, for example, WO-85/01420 and EP-0.140.767). The use of such substances for this purpose is, however, forbidden in many countries.

Discovery has recently been made of a preliminary processing procedure making it possible to restrict weight loss after blanching, cooking, or sterilization to levels never before achieved, without using additives.

Accordingly, the present invention concerns a vegetable-processing procedure comprising at least one preservation operation, such as blanching and/or cooking and/or sterilization, this procedure being characterized by the fact that, to restrict the loss of weight of the drained vegetables after said operation, the raw, washed, and trimmed vegetables undergo, at the outset, preliminary processing, one step of which consists in letting them stand at a temperature of 0° to 25° C. in a gas containing oxygen at a partial pressure greater than the partial pressure of atmospheric oxygen at said temperature.

The invention procedure may be carried out on various vegetables, such as asparagus, salsify (oyster plant), green beans, endive, palm hearts, artichoke hearts, and mushrooms, for example, cultivated mushrooms, charterelles, crepes, morels, etc.

The oxygen-containing gas used in the invention procedure is normally air or a mixture of nitrogen and oxygen. To ensure that the oxygen partial pressure is greater than the partial pressure of air, either the air can be enriched with oxygen or air can be compressed in an absolute pressure of at least $1.5 \times 10^5$ Pa, and, in particular, of at least $3.5 \times 10^5$ Pa.

The processing procedure according to the invention may be implemented in a suitable enclosed space, e.g., a stainless steel container, capable of withstanding the pressure of the processing gas.

The temperature within the enclosed space may range between 4 and 15° C.

The oxygen partial pressure may be either uniform or modified during the invention processing procedure, either by varying the pressure or by partial evacuation of the gaseous atmosphere and replacement thereof by an atmosphere containing a different proportion of oxygen.

In general, the gas contained in the processing chamber may be totally or partially replaced once or several times during the processing operation according to the invention.

The duration of the preliminary processing procedure according to the invention may vary depending on the type of vegetable processed, the planned preservation operation, and the desired minimum weight loss-reduction threshold. The preliminary processing time according to the invention may be determined in each case by simple routine experiments.

For example, preliminary processing must have a duration sufficient to ensure that the gravimeric processing yield expressed in % of the drained product after the preservation operation (blanching and/or cooking and/or sterilization) as compared with the raw, trimmed produce will be greater by at least 1 point than the processing yield achieved for vegetables of the same species that have not undergone this preliminary processing. It is restated here that yield increase by 1 point if its value, expressed in %, increases in terms of absolute value by one unit.

For example, as regards cultivated mushrooms (*Agaricus bisportus*), the preliminary processing time may be between 2 and 72 hours.

In general, and most notably when the vegetables to be processed are porous in nature, use will preferably be made, as the starting product, of raw, trimmed vegetables which have been impregnated with an aqueous liquid, this impregnation step being carried out in an enclosed space containing the vegetables intended for processing and placed under reduced pressure. This impregnation technique is conventionally known; see, the documents of prior art mentioned above.

This impregnation step may be carried out either with water or with water containing an approved preservative (such as $Na_2S_2O_5$) in a vacuum chamber, for example at a pressure of less than 1,300 Pa, and, in particular, of less than 800 Pa. The temperature of the impregnation liquid will, for example, be between 4° C. and 15° C.

Of course, the processing yield is calculated in relation to the raw, trimmed starting product that has not yet undergone impregnation.

Preferably, the enclosed space in which the preliminary processing procedure according to the invention is implemented is fitted with means for maintaining a relative humidity of at least 95%. In practice, it is necessary only that the bottom of the chamber hold a sufficient quantity of water to maintain a liquid phase during the entire preliminary processing period. Preferably, too, the processed vegetables will not come into contact with this liquid water. However, various intermittent vegetable-spraying operations can be performed during preliminary processing according to the invention.

The following examples illustrate the invention.

EXAMPLE 1

1 kg of raw, trimmed *Agaricus bisporus* mushrooms were placed in a cylindrical stainless steel container connected to a liquid ring vacuum pump and to an air compressor. The mushrooms were held in a nylon net and washed with water before being placed in the container.

It will be recalled that a "trimmed" vegetable is one in which all of the non-edible parts, in particular the earthy portions, have been removed.

An aqueous solution of $Na_2S_2O_5$ in a concentration of 0.4 g/L was added to the container until the mushrooms were completely immersed. The pressure was lowered to about 2,000 Pa and maintained at that level of 5 minutes.

The temperature inside the container was 15° C.

By feeding in air slowly over about 5 minutes, the pressure was then allowed to rise until reaching atmospheric pressure.

The impregnation solution was drained away.

The mushrooms thus processed were placed in a sterilizing apparatus equipped with temperature control and sold under the registered trade name MICROFLOW® by Barriquand (Roannes, France).

After adding the mushrooms still held in the net, the apparatus was connected to an air compressor until a pressure of $4.5 \times 10^5$ Pa was reached. This pressure was maintained for 24 hours, then brought down to atmospheric pressure by slow decompression over about 5 minutes.

The temperature within the apparatus was kept at 9° C. ±1° C.

The mushrooms were then blanched in boiling water for 15 minutes, then cooled in a circulating water bath at 15° C.

After cooling and draining for 10 minutes, metal cans were filled with 250 g of mushrooms, and the covering liquid was added (water, 20 g/L sodium chloride, and 2 g/L citric acid). The metal cans were sealed under a vacuum in a sealing apparatus sold by Food Machinery corporation (Sint Niklaas, Belgium), then the sealed cans were sterilized in a sterilizer, also sold by Food Machinery Corporation, at 135° C. for 6 minutes.

The cans were allowed to cool for 48 hours, then the drained weight was measured using the following procedure. The cans were opened and the contents poured onto a sieve 20 cm in diameter and having 2.5 mm mesh. Using a glass rod, the mushrooms whose caps were open were turned over, so that the open part was facing the mesh of the sieve. The mushrooms were allowed to drain for 2 minutes, then the drained mushrooms were collected and weighed.

The processing yield (ratio of the weight of the sterilized, drained mushrooms to the weight of the starting trimmed mushrooms, expressed as a %) was compared to that obtained without preliminary processing under a compressed air atmosphere.

In a series of 40 experiments, the increases in processing yield were 6 to 8 percentage points for the preprocessed products.

The organoleptic properties of the mushrooms obtained with or without preprocessing were similar.

EXAMPLE 2

The procedure undertaken in Example 1 was repeated. The apparatus was connected, not to an air compressor, but to a pressure reducing valve connected to a pressurized oxygen bottle until a pressure of $5 \times 10^5$ was reached. The temperature inside the container was kept at 10° C.

The remaining operations enumerated in Example 1 were performed.

The processing yield was compared with the yield obtained without preprocessing under an oxygen atmosphere.

In a series of 20 experiments, the increases in processing yield were 9 to 10 points achieved by the preprocessed products.

What is claimed is:

1. A method for processing and preserving vegetables, comprising exposing raw, washed and trimmed vegetables to a temperature in the range of 0° C. to 25° C. in a gas containing oxygen at a partial pressure greater than the oxygen partial pressure of air at said temperature to produce processed vegetables, and blanching, cooking and/or sterilizing said processed vegetables to produce preserved vegetables having a reduced loss of weight due to said exposing.

2. The method according to claim 1, wherein said gas is air or oxygen-enriched air.

3. The method according to claim 2, wherein said gas is air compressed to an absolute pressure of at least $1.5 \times 10^5$ Pa.

4. The method according to claim 3, wherein said pressure is at least $3.5 \times 10^5$ Pa.

5. The method according to claim 3, wherein said pressure is less than or equal to $10^6$ Pa.

6. The method according to claim 1, wherein the said gas is oxygen.

7. The method according to claim 6, wherein said gas is kept at a pressure of less than or equal to $10^6$ Pa.

8. The method according to claim 1, wherein said temperature is in the range of 4 to 15° C.

9. The method according to claim 1, wherein the duration of said exposing is sufficient to ensure that the processing yield, expressed in weight %, of the drained vegetables after said blanching, cooking and/or sterilizing in comparison with the raw, washed and trimmed vegetables is greater by at least one point than the processing yield obtained for vegetables of the same species that have not undergone said exposing.

10. The method according to claim 9, wherein said exposing is conducted for between 2 hours and 72 hours.

11. The method according to claim 1, wherein the raw, washed and trimmed vegetables have undergone impregnation using an aqueous liquid in a reduced pressure chamber prior to said exposing.

12. The method according to claim 1, wherein said vegetables are selected from the group consisting of asparagus, salsify, green beans, endive, palm hearts, artichoke hearts, and mushrooms.

* * * * *